3,066,130
PROCESS FOR FINISHING POLYOLEFINS
Werner Grundmann, Hofheim, Taunus, and Herbert Bestian, Heinz-Joachim Bahr, and Siegfried Sommer, Frankfurt am Main, Germany, assignors, by mesne assignments, to Hercules Powder Company Incorporated, Wilmington, Del., a corporation of Delaware
No Drawing. Filed Sept. 26, 1956, Ser. No. 612,099
Claims priority, application Germany Oct. 8, 1955
11 Claims. (Cl. 260—94.9)

This invention relates to a process of purifying polyolefins and, more particularly, to a process of removing catalyst residues from polyolefins which have been prepared by the low pressure processes.

In Belgian Patent 533,362 which corresponds to German patent applications Z3799, Z3862 and Z3882 IVc/39c, in Belgian Patent 534,792 which corresponds to German patent application Z3941 IVc/39c, in Belgian Patent 534,888 which corresponds to German patent application Z3942 IVc/39c, in Belgian Patent 540,459 which corresponds to German patent application Z4375 IVc/39c and in Belgian Patent 538,782, and in U.S. patent applications Serial No. 469,059, filed November 15, 1954, Serial No. 482,412, filed January 17, 1955, and Serial No. 482,413, filed January 17, 1955, which U.S. patent applications have been filed by Karl Ziegler, there is described a process for the preparation of high molecular weight polyolefins, especially polyethylenes. By the process described in these patents and patent applications, an olefin such as ethylene is contacted under relatively mild conditions of pressure and temperature with mixtures of alkali metal, alkaline earth metal, or earth metal organometallic compounds and salts of titanium, zirconium, hafnium, vanadium, niobium, chromium, molybdenum, tungsten, thorium, and uranium. Mixtures of organoaluminum compounds and titanium tetrahalides or zirconium tetrahalides have proved to be especially efficacious for starting the polymerization.

In accordance with the above patents and patent applications, inert dispersing agents, as for example, hydrocarbons such as hexane, heptane, octane, cyclohexane, toluene, and mixtures of aliphatic hydrocarbons or petroleum fractions are employed for the polymerizaton process. The polymer is then obtained as a finely divided suspension in solvent. Further processing is necessary to separate it from the dispersing agent and to free it of adhering or included catalyst residues. In the described patents, the polymer is separated from the dispersing agent by means of a filter and is then heated with methanolic hydrochloric acid in order to decompose and dissolve residual quantities of catalyst. After further filtration, the product is washed a few more times with methanol, isopropanol, butanol, cyclohexanol, or some other alcohol and then dried. Another possibility is immediately to treat the polymer suspension with an alcohol or alcoholic acid, stir it for a while and, if necessary, heat it. After filtration, the polymer is washed with an alcohol and dried. A third alternative is to treat the filtered product with aqueous acids, e.g., dilute nitric acid, or aqueous or alcoholic alkalies.

However, these methods of processing are not completely satisfactory. When the processing is carried out with alcohols or alcoholic acid solutions under the conditions indicated, the resulting polymer has a low residual catalyst content; hence, high quality products, but this method is impractical on a commercial scale because it requires such large quantities of alcohol. The aqeuous processing is relatively inexpensive but yields products with a high catalyst content which exerts an unfavorable influence on the quality of the polyolefin.

It has now been found that polyolefin suspensions which contain aliphatic hydrocarbons as dispersing agents and particularly those which contain low pressure polyethylenes may be processed by mixing the suspensions with from about 0.5% to about 5% and preferably from about 1% to about 3% of an alcohol, based on the dispersing agent, heating the mixture to a temperature of from about 40° C. to about 100° C. and preferably from about 60° C. to about 90° C., and then thoroughly extracting the mixture with water. The alcohol treatment is preferably carried out with the exclusion of air and moisture.

High quality products marked by good electrical properties are obtained by using the method of the invention. The residual catalyst content is extremely low. Furthermore, the process is extremely advantageous in that the requirement for alcohol is so low as to be commercially practical from an economical point of view.

The following procedure has proved to be advantageous: To the hot suspension of polyolefin, 0.5–5% of an aliphatic, cycloparaffinic, or aromatic alcohol, based on the dispersing agent, is added while still warm, preferably between 40° C. and 100° C., and with the exclusion of air and moisture; the mixture is agitated for a while at these temperatures. The catalyst included in the polymer or adhering to it is put into solution probably by the formation of complexes or solvates. Subsequent agitation or shaking of the alcohol-treated polymer suspension with water puts the polymerization catalyst into the aqueous phase. The catalyst can then be easily separated. To lower the content of residual catalyst, the polymer suspension is washed several times with water. After washing, the polymer is freed from the dispersing agent by filtration and processed in the usual manner.

The polyolefins obtained in this manner contained only a trace of residual catalyst. Ash values of <0.01% were obtained by following this procedure. As a result, high grade products are obtained, the processing of which yields completely colorless shaped articles. Particularly the electrical values of the polyolefins are improved. In order to improve the quality even more and to render the recovery of the hydrocarbon (dispersing agent) easier, the polyolefin processed according to the method of the invention is subsequently steam distilled.

Particularly suitable alcohols are those which are soluble to a certain extent in the dispersing agent and in the aqueous phase (dissolving intermediary). Examples of such alcohols are the lower aliphatic alcohols, cycloaliphatic alcohols such as cyclohexanol and aralkyl alcohols such as benzyl alcohol. Aliphatic alcohols, such as isopropyl alcohol or n-butanol have proved to be the most suitable. Dihydric or polyhydric alcohols are less suited because of their limited solubility in hydrocarbons. However, if the operation is carried out at correspondingly high temperatures, low ash values can be obtained even with polyhydric alcohols. Naturally, suitable mixtures of alcohols may also be used in the process, as for example, mixtures of butanol and methanol or butanol and isopropanol.

Ordinary drinking water may be used; however, salt-free or distilled water is preferred. To produce certain effects, some compounds may be added to the aqueous phase. Care must be taken that the catalyst solutions obtained after mixing the polymer suspension with the aqueous phase are clear. When an alcohol-polymer suspension which contains titanium is mixed with dilute aqueous sodium hydroxide, a precipitate of titanium hydroxide forms in the aqueous layer; but the precipitate can be removed from the polymer. When the operation is carried out in acid medium, for example, in dilute aqueous hydrochloric acid, a clear catalyst solution which can easily be separated is obtained. The residual catalyst content of the polyolefins processed in this manner is extremely low just as in the case of pure water.

To protect the apparatus from corroding, a buffer, that is, a pH-controlling substance, such as sodium acetate is added to the aqueous phase. Aqueous solutions of organic amines may also be used. Exemplary of such amines is ethylene diamine or triethanol amine. When these or similar compounds are used, catalyst solutions which can easily be separated from the polymer suspension are obtained.

It is understood that the two steps of the process described above may be carried out as a continuous or as a discontinuous operation.

*Example 1*

A mixture consisting of 1000 ml. of a polyethylene suspension and of saturated aliphatic hydrocarbons which boil at 200°–220° C. and which were obtained by polymerizing ethylene with titanium tetrachloride and diethylaluminum chloride in the hydrocarbons mentioned (30% polymer) was agitated with 20 ml. of butanol for one hour at 70° C. under nitrogen. The brown polymer turned white; the titanium catalyst went into solution with the formation of a blue color. After cooling the reaction mixture, 20 ml. of salt-free water was added and the mixture agitated for 30 minutes. The polymerization catalyst passed into the aqueous layer; a clear, deep blue aqueous solution formed which was carefully separated from the colorless polymer suspension by means of a separatory funnel. After washing 3 times with 200 ml. portions of water, the dispersing agent was removed from the polymer by filtration under suction, washed once more with water on the filter and dried at 80° C. under a vacuum. The polymer obtained was completely colorless and had an ash value of <0.01%. When this polymer is processed at about 200° C., colorless molded articles are obtained. The electrical values of the product are exceptionally good.

*Example 2*

300 liters of a polyethylene suspension which was prepared similarly as in Example 1 and which contained approximately 100 kg. of polyethylene was agitated with 3 liters of isopropanol for one hour at 80° C. under nitrogen in an enameled vessel. The reaction mixture was pressed while still hot into a vessel containing 100 liters of distilled water and agitated for 20 minutes. The aqueous layer was then removed and the agitation repeated 3 more times using the same amount of water. After the dispersing agent was removed from the polymer by centrifugation, the hydrocarbon-containing polyethylene was heated to 100° C. in 500 liters of water with the addition of 0.5 kg. of sulfonated oil (emulsifier) and freed of the hydrocarbon by the introduction of steam. After the steam distillation, the product was centrifuged, washed several times with water, and dried in a circulating-air oven at 70° C.

A colorless polymer having the desired low ash value of 0.02% was obtained.

What we claim and desire to protect by Letters Patent is:

1. A process for removing solid catalyst residues from a suspension of a solid polyolefin in an aliphatic hydrocarbon dispersant, said polymer having been prepared by the low pressure polymerization of an olefin in a catalyst system consisting of (1) a metallo-organic compound of an element of groups I–III of the periodic table and (2) a compound of a metal of sub-groups IV–VI of the periodic table, which comprises adding to said suspension about 0.5–5% by volume, based on the dispersant, of a monohydric alcohol, heating the mixture to a temperature of about 40° to 100° C. to dissolve the catalyst residues, and then extracting the whole of said mixture with water whereby the catalyst residues are transferred in solution to the aqueous phase.

2. The process of claim 1 wherein the alcohol addition and subsequent heating of the mixture is effected in the absence of oxygen and water.

3. The process of claim 1 wherein the polyolefin is polyethylene.

4. The process of claim 1 wherein the alcohol is a lower aliphatic alcohol.

5. The process of claim 1 wherein a buffering agent is added in the water extraction step in an amount sufficient to prevent corrosion of the apparatus and insufficient to cause precipitation of catalyst residues.

6. The process of claim 1 wherein the alcohol is at least partially soluble in the dispersant and in the aqueous phase.

7. The process of claim 6 wherein the alcohol is selected from the group consisting of a lower aliphatic alcohol, cyclohexanol, and an aralkyl alcohol.

8. In a process wherein a suspension of polyethylene in a saturated aliphatic hydrocarbon is formed by the polymerization of ethylene in contact with a titanium chloride-aluminum alkyl catalyst dispersed in the aforesaid aliphatic hydrocarbon, said polyethylene suspension containing residual catalyst, the improved method of removing said catalyst residues from the polyethylene which comprises adding to said suspension about 0.5–5% by volume, based on the volume of aliphatic hydrocarbon dispersant, of a lower aliphatic monohydric alcohol, heating the mixture to a temperature of about 60° to 90° C. under a nitrogen atmosphere whereby the suspended polymers turn white and the residual catalyst goes into the solution, cooling the reaction mixture, and then extracting the whole of said mixture with water whereby the residual catalyst is transferred in solution to the aqueous phase, the separated polymer being colorless and having an ash value of <0.01% by weight.

9. The process of claim 8 wherein said aliphatic monohydric alcohol is butanol.

10. The process of claim 8 wherein said aliphatic monohydric alcohol is isopropanol.

11. The process of claim 8 wherein the polyethylene is steam distilled subsequent to its extraction with water.

References Cited in the file of this patent

UNITED STATES PATENTS

| | | |
|---|---|---|
| 2,440,498 | Young et al. | Apr. 27, 1948 |
| 2,458,378 | Herbolsheimer | Jan. 4, 1949 |
| 2,813,136 | Mertz | Nov. 12, 1957 |
| 2,833,755 | Coover | May 6, 1958 |
| 2,838,477 | Roelen et al. | June 10, 1958 |
| 2,867,612 | Pieper et al. | Jan. 6, 1959 |

FOREIGN PATENTS

| | | |
|---|---|---|
| 533,362 | Belgium | May 16, 1955 |